UNITED STATES PATENT OFFICE.

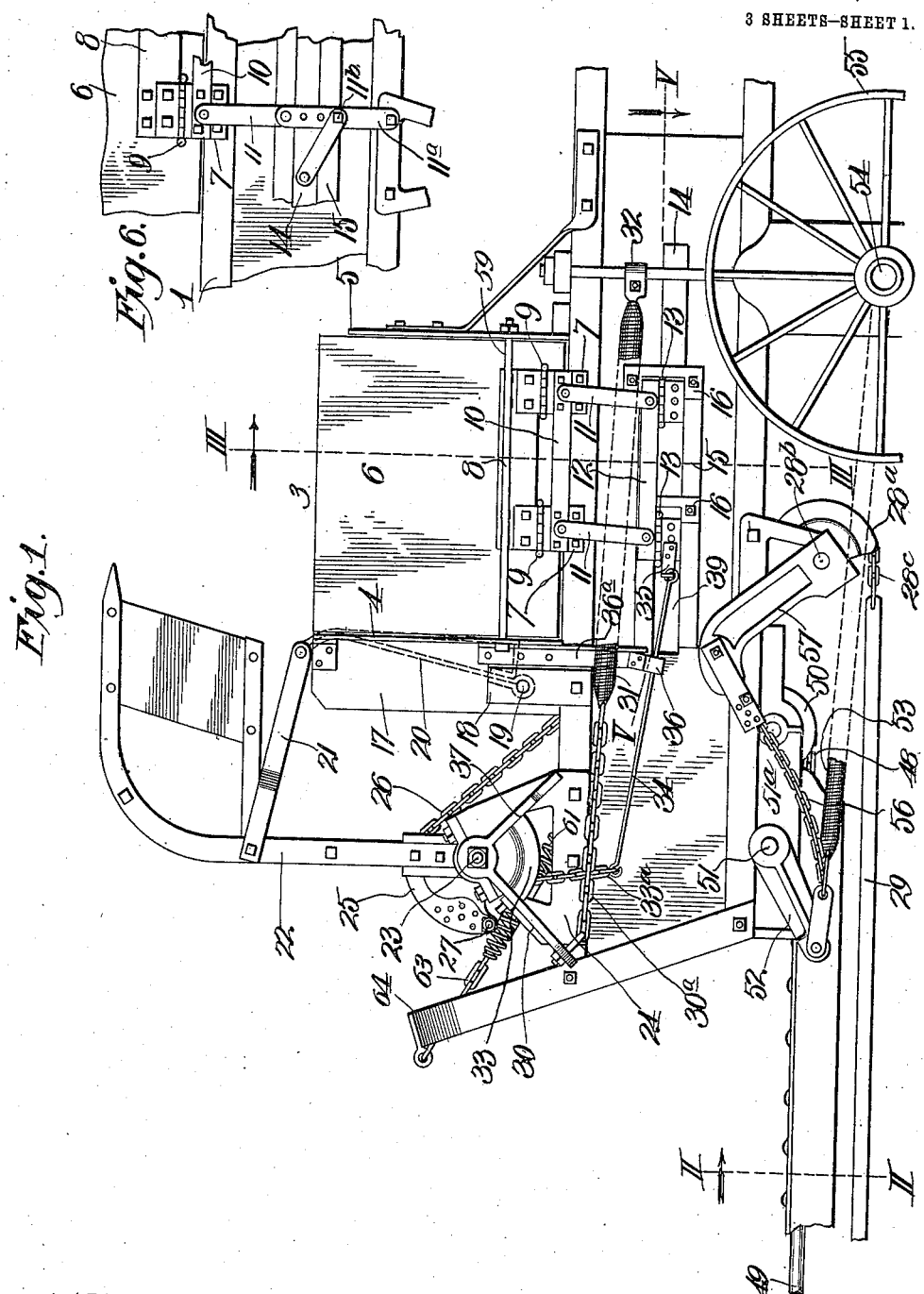

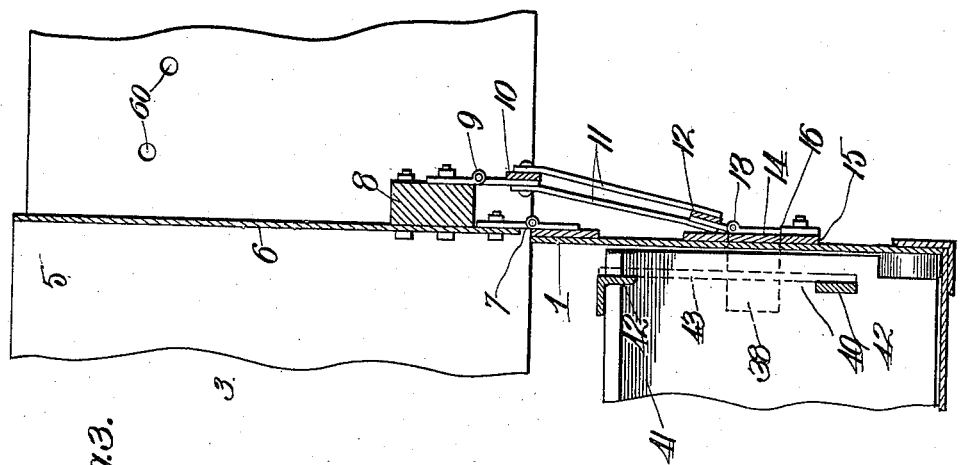

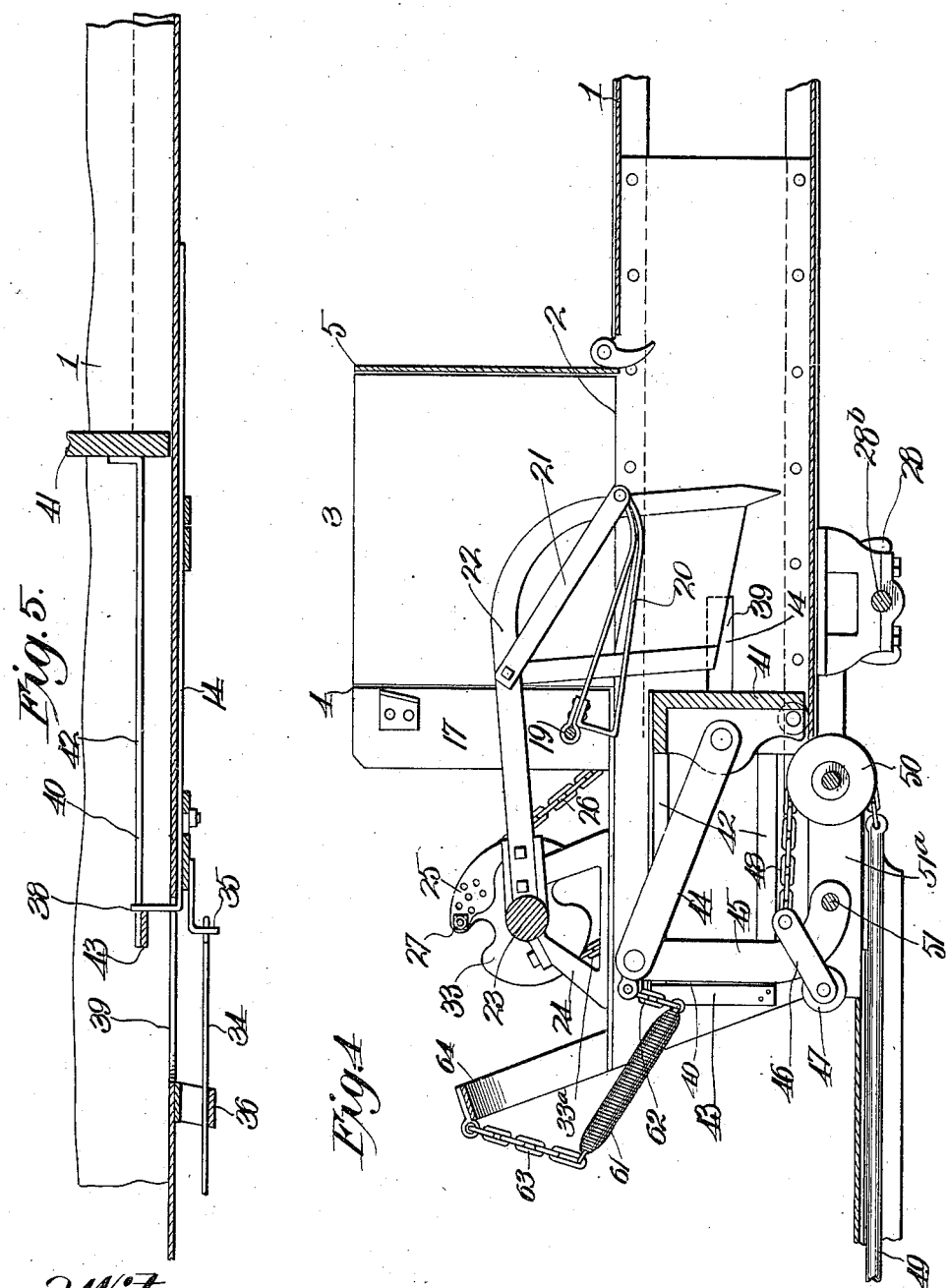

ARTHUR H. SYMONS, OF KANSAS CITY, MISSOURI.

BALING-PRESS.

984,717.

Specification of Letters Patent. Patented Feb. 21, 1911.

Application filed August 4, 1909. Serial No. 511,249.

*To all whom it may concern:*

Be it known that I, ARTHUR H. SYMONS, a citizen of the United States, residing at Kansas City, in the county of Jackson and State of Missouri, have invented certain new and useful Improvements in Baling-Presses, of which the following is a specification.

This invention relates to baling presses and more especially to feeding mechanism for such presses, my particular object being to produce a hopper having side walls movable independently or together to condense the baling material preliminary to the deposit thereof in the baling chamber and independently adjustable to insure efficient and expeditious feeding from either side of the baling press or from a stack or wagon.

With this object in view and others as hereinafter appear, the invention consists in certain novel and peculiar features of construction and organization as hereinafter described and claimed; and in order that it may be fully understood reference is to be had to the accompanying drawings, in which;

Figure 1, is a side elevation of the baling end of a press embodying my invention. Fig. 2, is a section on the line II—II of Fig. 1. Fig. 3, is an enlarged vertical section on the line III—III of Fig. 1. Fig. 4, is a vertical longitudinal section on the line IV—IV of Fig. 2. Fig. 5, is a horizontal section on the line V—V of Fig. 1. Fig. 6, is a detail view of a modified mechanism for operating one of the hinged walls of the hopper.

In the said drawings, 1 indicates a baling case provided with a feed-opening 2 in its upper side and a hopper 3 communicating at its lower end with the said opening, the hopper comprising the substantially vertical front and rear walls 4 and 5 extended laterally at their ends beyond the sides of the case, as shown most clearly in Figs. 2 and 3, and a pair of side walls 6 hinged at their lower edges at 7 to the upper edges of the baling case and having ranges of movement of about ninety degrees, so as to be capable of swinging when necessary from a horizontal to a vertical position and vice versa, between the lateral extensions of the walls 4 and 5, and secured to the outer sides of the hinged side walls are bars 8 connected by hinges 9 to longitudinally-extending bars 10 connected pivotally by double links 11 to slide-bars 12 connected by hinges 13 to slide plates 14 resting upon bars 15 secured rigidly to the side walls of the baling chamber, and held snugly against said side walls by keepers 16 secured to bars 15, the arrangement being such that forward movement of plates 14 results in an expansion of the toggle connection constituted by said plates and links 11,—and the consequent downward and outward swinging movement of walls 6, contraction of said toggles resulting in reversing such movement of said walls it being noticed that when the toggle is fully contracted links 11 are substantially vertical and thus lock the walls in their raised positions and thus make it impossible for them to open until the toggles are expanded. Just forward of walls 4, the baling case is provided with a pair of uprights 17 in the plane of the side walls of the baling case and journaled in bars 18 secured to the baling case and said uprights, is a rock shaft 19 having a pair of arms preferably in the form of frames 20, pivotally connected by links 21 to a feeder 22, of the same general type and arrangement as that embodied in patent on baling press No. 665,191 issued to C. W. Davidson, January 1, 1901, the central portion of the wall 4 being cut away between the uprights 17 to accommodate the arms 20, links 21 and the feeder in the compression and withdrawal movements of the latter, Fig. 1, showing the feeder in its initial position and Fig. 4 in its depressed position. The feeder is mounted on a rock shaft 23 journaled in bearing brackets 24 secured on the front extensions of the upper angle irons of the baling case and provided with a crank-arm in the form of a peripherally grooved segment 25, over which is trained a flexible connection or chain 26, the same being secured at one end as at 27 to the segment. At its opposite end the flexible connection or chain is trained over and fastened to a peripherally grooved segment 28. A segment 28$^a$ mounted on shaft 28$^b$ of segment 28, is engaged by a chain 28$^c$ connected to the rear end of a pull rod 29, which, when drawn in a forward direction is instrumental through the connections described, in causing the feeder to swing downward through the hopper and into the baling case to force a charge of baling material from the hopper down into the said case in the path of the plunger, as usual.

30 is a crank-arm projecting from shaft 23 and connected by a chain 30$^a$ and a retractile spring 31 to a fixed point of the baling case, as indicated at 32.

33 is a pair of segments on shaft 23, one of said segments being cast with segment 25 and both of said segments 33 are connected to flexible connections or chains 33$^a$, connected by links 34 to brackets 35 secured to the front ends of slide plates 14, said links being maintained in substantially horizontal positions by the overlying keepers 36 secured to angle-bars 36$^a$ fastened to the baling case and the uprights 17 to assist in holding the latter in position.

37 is a forked-arm rotatable with shaft 23 and adapted in the downward movement of the feeder to engage the chain 30$^a$ to hold it away from shaft 23 and thus give the spring 31 sufficient leverage to easily effect the reelevation of the feeder, as hereinafter explained. It will be seen that when the feeder starts on its downward stroke, the segments 33 are instrumental in sliding plates 14 forward to effect the downward and outward swinging movement of the side walls of the hopper, these movements being in opposition to the pull of spring 31, and that as the pull rod 29 is released when at its forward limit of movement, the retractive action of said spring restores the feeder to its original or elevated position.

To swing the side walls upward to condense a charge of baling material, the slide plates 14 are provided at their front ends with arms 38 projecting inwardly through longitudinal slots 39 in the side walls of the baling case and into longitudinal slots 40 formed by frames projecting forwardly from the usual baling plunger 41, each of said frames preferably consisting of a pair of longitudinal bars 42 connected at their front ends by short upright bars 43, the arrangement being such that when the plunger has nearly completed its compression stroke, bars 43 strike arms 38 and force the slide plates 14 rearwardly and thereby contract the toggles hereinbefore referred to, and swing the side walls of the hopper to their vertical positions. The plunger 41 as in the patent hereinbefore referred to, is connected to the forward extensions of the lower angle irons of the baling case by a toggle consisting of links 44 and 45, and fitting over link 45 is a loop 46 provided with an antifriction roller 47, the opposite end of the loop being connected by a chain 48 to a pull-rod 49 connected to the power mechanism, not shown, the chain being trained around a sheave 50. To the mechanism for imparting movement to the plunger no claim is made, as the same corresponds in all essential particulars to that embodied in the patent hereinbefore referred to.

The shaft 51 which is journaled in castings 51$^a$ secured to the extensions of the lower angle irons of the baling case and carries link 45, is equipped with a crank arm 52 connected by a rectractile spring 53 to the axle 54 of the wheels 55, or said spring may be connected to any other fixed point of the machine, this spring being for the purpose of effecting the withdrawal stroke of the plunger, and to insure such withdrawal of the plunger in the event that the spring 53 fails to accomplish such purpose, a chain 56 is connected to crank-arm 52 and to a crank-arm 57 rigidly secured on one end of the shaft 28$^b$ of segments 28 and 28$^a$, so that when pull-rod 29 is operated to effect the descent of the feeder, the chains 56, will, if the plunger has failed to return to its original position, pull rearward on crank-arm 52 and thus effect the return of the plunger so as to avoid any possibility of the feeder striking the plunger. To assist in effecting the withdrawal movement of the plunger by exerting a force tending to contract the toggle constituted by links 44 and 45, a retractile spring 61 is connected by a chain 62 to the middle of said toggle and by a chain 63 to an arched frame 64 secured to and projecting upward from the front end of the baling case. When the plunger makes its power stroke it tensions said spring 61 so that the latter shall exert an upward and forward pull tending to contract the toggle as will be readily understood.

Assuming that the parts are in the position shown in Fig. 1 and that the plunger withdraws, it will be seen that the feeder starts downward into the hopper and engages a charge of baling material therein and moves the same downward, and that as the baling material is pushed from the hopper into the baling case, the chains 33$^a$ are tightened and cause slide plates 14 to move forward and thus impart outward and downward movement to the hinged side walls 6, such movement of the side walls being limited by stop-bars 59 connecting the lateral extensions of the front and rear end walls of the hopper, it being noticed that said extensions are provided with a series of holes 60 whereby said stop-bars may be adjusted to limit such outward movement of the hinged walls. It will be noticed that the frames 20 of shaft 19 come into engagement with the baling material adjacent to the hinged walls 6 and start to push the same downward before such charge of material is engaged by the feeder and hence act to concentrate the baling material under the feeder and insure all of it being forced by the same down into the baling case. Just after the feeder is returned to its elevated position after forcing the charge of baling material down into the baling chamber behind the withdrawn plunger, the latter starts on the following power or compression stroke and forces the charge of baling material rearwardly in the baling case, and its apron, not shown, forms a false bottom for the hopper to prevent the second charge of baling material at this time introduced, from dropping down into the path of the return movement of the plunger. Just before such power stroke is completed, the bars 43 of the extension frames of the plunger strike the inwardly-projecting arms 38 of the slide plates 14 and cause said hinged side walls to swing upward and condense the charge of baling material between them, the ensuing actions being repetitions of those described.

It will be seen from the foregoing that the machine may be fed from both sides simultaneously, and that if it is desired to feed from one side only the person in control will raise the hinged wall at the opposite side and so secure it by proper adjustment of its stop-bar, such wall therefore forming an abutment against which the material may be thrown. If the hopper is to be fed from a wagon, stack or other elevated point, it is preferable to arrange the stop-bars so as to hold the hinged side walls when opened, in an upwardly-diverging relation in order that they may centralize or concentrate the baling material over the feed opening and thus facilitate the feeding operation.

In Fig. 6, a modified form of toggle is shown, the same consisting of a toggle-link 11 and a toggle-link 11ª pivotally connected together, and link 11ª to a fixed part of the machine, link 11ª being adjustably connected by a bolt 11ᵇ to the slide-bar 14 so that movement of said slide-bar in one direction or the other will effect the expansion or contraction of the toggle and the consequent raising or lowering of the connected wall 6.

From the above description it will be apparent that I have produced a baling press embodying the features of advantage enumerated in the statement of the object of the invention and while I have illustrated and described the preferred embodiment of the invention, it will be understood that it is susceptible of modification in various particulars without departing from the spirit and scope or sacrificing any of the advantages of the appended claims.

Having thus described the invention what I claim as new and desire to secure by Letters-Patent, is;

1. In a baling press, a baling case having a feed-opening, and a hopper communicating therewith, said hopper having a hinged side wall capable of swinging from a substantially horizontal to a substantially vertical position and vice versa, a reciprocatory baling plunger, means actuated by the compression stroke of said plunger for swinging the said hinged wall upward, a feeder to swing down into the hopper while the said wall is elevated, means for swinging the wall toward a horizontal position before the downward movement of the feeder is completed, and means for effecting the reëlevation of the feeder.

2. In a baling press, a baling case having a feed-opening, and a hopper communicating therewith, said hopper having a hinged side wall capable of swinging from a substantially horizontal to a substantially vertical position and vice versa, a reciprocatory baling plunger, means actuated by the compression stroke of said plunger for swinging the said hinged wall upward, a feeder to swing down into the hopper while the said wall is elevated, means for swinging the wall toward a horizontal position before the downward movement of the feeder is completed, and adjustable means to arrest the swinging movement of the said wall toward a horizontal position.

3. In a baling press, a baling case having a feed-opening, and a hopper communicating therewith, embodying a hinged side wall, a longitudinally-slidable bar suitably guided, a link establishing a pivotal relation between said slidable bar and said hinged wall, a reciprocatory plunger, and means whereby said plunger in its compression stroke, shall operate said slidable bar and raise said hinged wall.

4. In a baling press, a baling case having a feed-opening, and a hopper communicating therewith, embodying a hinged side wall, a longitudinally-slidable bar suitably guided, a link establishing a pivotal relation between said slidable bar and said hinged wall, a reciprocatory plunger, means whereby said plunger in its compression stroke, shall operate said slidable bar and raise said hinged wall, a feeder to swing down into and withdraw from the hopper, and means for reversing the operation of said slidable bar and said hinged wall during the downward movement of the feeder.

5. In a baling press, a baling case having a feed-opening, a hopper communicating therewith and consisting of a front and a rear wall at opposite ends of the feed-opening and provided with lateral extensions projecting beyond the sides of the case, a pair of side walls for the hopper, hinged at their lower ends to said case and adapted to swing downward and upward between said extensions, toggles connected to said hinged walls, and consisting of slide plates suitably supported and links hinged at their lower ends to said slide plates and at their upper ends to said hinged walls, a reciprocatory plunger, means whereby the compression stroke of the plunger shall operate said slide plates and contract said toggles to produce upward movement of said hinged walls, means for moving the said side walls downward, and means adjustable on said lateral extensions for limiting the downward movements of the said hinged walls.

6. In a baling press, a baling case having a feed-opening a hopper communicating with said opening, and embodying a hinged side wall capable of swinging from a substantially horizontal to a substantially vertical position and vice versa, a reciprocatory plunger in the baling case, means movable with the plunger, a slide-bar, a link pivotally connecting the slide-bar with the said side wall and in conjunction with said slide bar constituting a toggle; and means movable with the plunger being adapted on the compression stroke of the plunger, to effect the contraction of said toggle for causing it to raise and secure the said wall in its vertical position.

7. In a baling press, a baling case having a feed-opening, a hopper communicating with said opening, and embodying a hinged side wall capable of swinging from a substantially horizontal to a substantially vertical position and vice versa, a reciprocatory plunger in the baling case, means movable with the plunger, a slide-bar, a link pivotally connecting the slide-bar with the said side wall and in conjunction with said slide bar constituting a toggle; the means movable with the plunger being adapted on the compression stroke of the plunger, to effect the contraction of said toggle for causing it to raise and secure the said wall in its vertical position and means for moving the slide-bar of the toggle forwardly to cause said wall to move downward.

8. In a baling press, a baling case having a feed-opening, a hopper communicating therewith, comprising end walls extended laterally beyond the baling case and a pair of side walls hinged to the upper edges of the side walls of the baling case and capable of swinging from a horizontal to a vertical position and vice versa between said extensions of the end walls, toggles connected to said hinged side walls, pulling means connected to the toggles to expand the same and thereby swing said side walls downward and outward, a reciprocatory plunger in the baling case, means movable with the plunger, and means movable with the toggles, adapted to be struck and moved by the means movable with plunger in the compression stroke of the latter, to contract the toggles and thereby effect the upward swinging movement of the said side walls to their vertical or condensing positions.

9. In a baling press, a baling case having a feed-opening, a hopper communicating therewith, comprising end walls extended laterally beyond the baling case and a pair of side walls hinged to the upper edges of the side walls of the baling case and capable of swinging from a horizontal to a vertical position and vice versa between said extensions of the end walls, toggles connected to said hinged side walls, pulling means connected to the toggles to expand the same and thereby swing said side walls downward and outward, a reciprocatory plunger in the baling case, means movable with the plunger, means movable with the toggle, adapted to be struck and moved by the means movable with the plunger in the compression stroke of the latter, to contract the toggles and thereby effect the upward swinging movement of said side walls to their vertical or condensing positions and stop-bars connecting the extensions of the end walls and adjustable thereon to limit the downward or opening movements of said side walls.

10. In a baling press, a baling case provided with a feed-opening, a hopper communicating with said opening, a feeder to swing into and out of the baling case and through said hopper, frames pivoted to fixed points on the press at the front end of the hopper, and means actuated by the feeder when swinging into the hopper to swing the said frames downward into the hopper in advance of the feeder and at opposite sides of the plane of movement of the same to engage the side portions of the charge of baling material in the hopper and start to force it downward before the feeder engages such charge.

11. In a baling press, a baling case provided with a feed-opening, a hopper communicating with said opening, a feeder to swing into and out of the baling case and through said hopper, a pair of swing frames at opposite sides of the plane of movement of the feeder, and a pair of links pivotally connecting said frames with the feeder.

In testimony whereof I affix my signature, in the presence of two witnesses.

ARTHUR H. SYMONS.

Witnesses:
HELEN C. RODGERS,
G. Y. THORPE.